US005229188A

United States Patent [19]

Takeuchi et al.

[11] Patent Number: 5,229,188

[45] Date of Patent: Jul. 20, 1993

[54] TRANSPARENT FILM AND COLOR IMAGE FORMING METHOD

[75] Inventors: Tatsuo Takeuchi, Kawasaki; Koji Amemiya, Tokyo, both of Japan

[73] Assignee: Canon Kabushiki Kaisha, Tokyo, Japan

[21] Appl. No.: 668,149

[22] Filed: Mar. 12, 1991

Related U.S. Application Data

[63] Continuation of Ser. No. 369,851, Jun. 22, 1989, abandoned.

[30] Foreign Application Priority Data

| | | | |
|---|---|---|---|
| Jun. 29, 1988 | [JP] | Japan | 63-163107 |
| Dec. 23, 1988 | [JP] | Japan | 63-326521 |
| Jun. 15, 1989 | [JP] | Japan | 1-154193 |

[51] Int. Cl.$^5$ .......... B32B 9/00

[52] U.S. Cl. .......... 428/195; 428/76; 428/323; 428/411.1; 430/285; 430/286

[58] Field of Search .......... 430/285, 286; 428/76, 428/195, 323, 411.1

[56] References Cited

U.S. PATENT DOCUMENTS

| | | | |
|---|---|---|---|
| 3,645,730 | 2/1972 | Frank et al. | 430/288 |
| 4,124,384 | 11/1978 | Centa | 430/201 |
| 4,197,129 | 4/1980 | Muroi et al. | 427/40 |
| 4,234,644 | 11/1980 | Blake et al. | 428/204 |
| 4,489,122 | 12/1985 | Kammin et al. | 428/212 |
| 4,525,444 | 6/1985 | Doessel | 430/96 |
| 4,599,293 | 7/1986 | EcKell et al. | 430/285 |

FOREIGN PATENT DOCUMENTS

| | | |
|---|---|---|
| 0078475 | 5/1983 | European Pat. Off. . |
| 0194776 | 9/1986 | European Pat. Off. . |
| 57-52058 | 3/1982 | Japan . |

OTHER PUBLICATIONS

H. Burrell, "Solubility Parameter Values," Polymer Handbook, 2nd Edition, p. IV-337.

A. B. Amidon, "Cohesive Transfer and Fixing Process", Xerox Disclosure Journal, vol. 4, No. 2, Mar. 1, 1979, p. 141.

*Primary Examiner*—Patrick J. Ryan
*Assistant Examiner*—W. Krynski
*Attorney, Agent, or Firm*—Fitzpatrick, Cella, Harper & Scinto

[57] ABSTRACT

A transparent laminate film, including at least a first transparent resin layer comprising a transparent resin having a heat-resistance, and a second transparent resin layer disposed thereon comprising a transparent resin, wherein the transparent resin of the second transparent resin layer has a compatibility with a binder resin of a toner to be fixed thereon, and has a large elasticity than that of the binder resin of the toner at a fixing temperature of the toner.

16 Claims, 6 Drawing Sheets

TRANSPARENT FILM AND COLOR IMAGE FORMING METHOD

This application is a continuation of application Ser. No. 07/369,851 filed Jun. 22, 1989, now abandoned.

FIELD OF THE INVENTION AND RELATED ART

The present invention relates to a transparent laminate film for carrying a color toner image formed by electrophotography or electrostatic printing, particularly to a transparent laminate film used for a overhead projector (hereinafter, referred to as "OHP") and an image-forming method for forming a color image on a transparent laminate film.

Hitherto, a mono-color toner image has been formed on a film such as transparent polyester film by means of an electrophotographic apparatus and the resultant film carrying the toner image is generally provided for an OHP, whereby the image has been used for forming a projection image. Since full- or multi-color images have recently been formed by means of an electrophotographic apparatus, there has been eager demand such that the full- or multi-color image formed on a transparent film is used for forming the above-mentioned projection image.

However, in a case where color or full-color image is formed on a transparent film by an electrophotographic process using a dry developing method and the resultant image is used for forming a projection image by means of an OHP, the thus formed projection image shows a gray tone as a whole, although the image formed on the film shows sufficient color formation characteristics. As a result, the color-tone reproduction range becomes very narrow.

The reason for such a phenomenon may be considered that the toner particles attached to a smooth transparent film are not sufficiently fluidized under heating at the time of fixing but retain particulate characteristics, whereby incident light is scattered at the time of projection and forms a shadow on a screen. Particularly, in a medium or middle tone portion having a low image density, the number of toner particles attached thereto is reduced whereby the absorption by a dye or pigment contained therein is also reduced. As a result, since the degree of such absorption becomes equal to that of black absorption of visible rays, whereby a color tone to be reproduced becomes a gray tone.

In order to solve the above-mentioned problem, there has been proposed that the toner particles per se constituting a color image formed on a film are smoothed, or a color image formed on a film is smoothed, as disclosed in Japanese Laid-Open Patent Application (KOKAI) No. 80273/1988. Specific examples of such a smoothing method include:

(1) one wherein the toner particles are fixed at a temperature at which they are sufficiently fused;

(2) one wherein the toner particles are fixed by using a solvent such as toluene;

(3) one wherein the fixed image is ground; and (4) one wherein a transparent paint not dissolving the toner is applied onto the fixed image.

However, when the above-mentioned methods are applied to full-color image formation, there occur various problems as follows.

In the case of the above-mentioned method (1) wherein the fixing is effected at a high temperature by using a fixing roller, when a half-tone portion having a small amount of toner particles is intended to be smoothed, a so-called offset phenomenon occurs in a portion having a large amount of toner particles (e.g., a black portion wherein cyan toner, magenta toner and yellow toner are co-present). When a non-contact-type heat fixing device such as oven is used, the transparent film is waved and a considerable period of time is required in order to obtain sufficient transmittance.

In the case of the above-mentioned method (2) using a solvent, when the toner particles are sufficiently fluidized by use of a solvent so that those constituting a half-tone portion lose their particulate property, distortion or flow of an image occurs in a high-image density portion.

In the case of the above-mentioned method (3) using the grinding of an image, the transmittance is increased in a portion having a relatively large amount of toner particles, but the particulate property of those constituting a low-image density portion is not sufficiently removed. As a result, it is difficult to remove shadows due to the peripheries of the toner particles.

In the case of the above-mentioned method (4) wherein a transparent paint not dissolving toner particles is applied onto a toner image, clear boundaries or interfaces can sometimes be formed between the toner particles and the paint, whereby black absorption occurs in a reflection-type OHP due to light scattering caused by the boundaries.

Incidentally, in order to enhance the color reproducibility in a full-color image, there may be used a binder resin for color toner such that it provides high fluidity and a low-viscosity state (about $10^4$ poise) at the time of fixing. In order to fix the low-viscosity toner without causing high-temperature offset (i.e., an offset phenomenon such that when a color toner image formed on the transparent laminate film is fixed by a fixing means such as heat pressure roller, the melted toner image adheres to the heat pressure roller), a dimethylsilicone oil having a viscosity of 100–1,000 cs (centistokes) is ordinarily used as a supplemental release agent. Accordingly, in the case of the above-mentioned method (4), when the dimethylsilicone oil is used, the paint cannot sufficiently adhere to the transparent film, whereby it causes new image unevenness.

As described hereinabove, in the prior art, various problems have occurred when sufficient color reproducibility is intended to be attained by using transmission light based on a full-color image formed on a transparent film.

SUMMARY OF THE INVENTION

An object of the present invention is to provide a transparent film capable of providing a good full-color projection image.

Another object of the present invention is to provide a transparent film capable of preventing high-temperature offset.

A further object of the present invention is to provide a transparent film excellent in color reproducibility.

A further object of the present invention is to provide a transparent film excellent in color reproducibility for a full-color image.

A further object of the present invention is to provide a color image-forming method for simply forming a transparent film carrying a full-color image which is excellent in light-transmittance.

A further object of the present invention is to provide a full-color image forming method excellent in color reproducibility.

A further object of the present invention is to provide a color image forming method for forming a transparent film carrying a full-color image wherein a low-temperature offset phenomenon (i.e., an offset phenomenon which occurs in a case where the fixing temperature is too low and the adhesion of a toner to a heat pressure roller is stronger than that to a film) and a high-temperature offset phenomenon are suppressed.

According to the present invention, there is provided a transparent laminate film, comprising: at least a first transparent resin layer comprising a transparent resin having a heat-resistance, and a second transparent resin layer disposed thereon comprising a transparent resin; the transparent resin of the second transparent resin layer having a compatibility with a binder resin of a toner to be fixed thereon, and having a large elasticity than that of the binder resin of the toner at a fixing temperature of the toner.

The present invention also provides a method for forming a light-transmissive color image, comprising:

providing a transparent laminate film for light-transmission, which comprises at least a first transparent resin layer comprising a transparent resin having a heat-resistance, and a second transparent resin layer disposed thereon comprising a transparent resin; the transparent resin of the second transparent resin layer having a compatibility with a binder resin of a toner to be fixed thereon, and having a larger elasticity than that of the binder resin of the toner at a fixing temperature of the toner;

forming on the transparent laminate film a color toner image comprising a toner which comprises at least the binder resin and a chromatic colorant; and fixing the color toner image on the transparent laminate film under application of heat and pressure.

The present invention further provides a transparent laminate film, comprising: a first transparent resin layer comprising a transparent resin having a heat-resistance, and a second transparent resin layer disposed thereon; comprising a transparent resin; the transparent resin of the second transparent resin layer having a solubility parameter of 9.5–12.5, and a storage elasticity modulus (G') of 100–10,000 dyne/cm$^2$ at 160° C.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The present invention provides a transparent laminate film which is suitably used for providing an OHP transparent film carrying a full-color image excellent in light-transmissivity and color reproducibility, by use of a method which is simpler than the above-mentioned conventional method. The present invention also provides a process for preparing a transparent film carrying a color image. In a case where the transparent laminate film according to the present invention is used, when a color toner image formed on the transparent laminate film is fixed by a fixing means such as heat pressure roller, a high-temperature offset phenomenon such that the melted toner image adheres to the heat pressure roller may be suppressed.

More specifically, the present invention provides a laminate film comprising a first transparent resin layer having a heat-resistivity and a second transparent resin layer disposed thereon, wherein the second transparent resin layer comprises a transparent resin which is compatible with a binder resin constituting a toner to be used for color image formation, and has a heat-fusing characteristic which is different from that of the binder resin at a fixing temperature. By using such a laminate film, good transparency and good color reproducibility are attained.

Figure 3A:
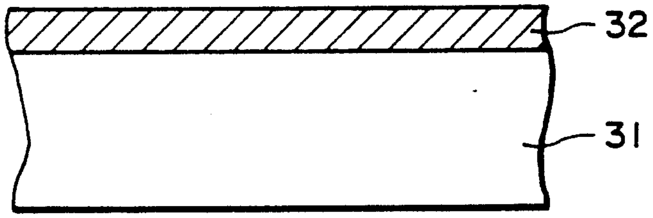
FIGS. 3A and 3B are schematic sectional views each showing an embodiment of the transparent laminate film according to the present invention in the thickness direction.
Figure 3B:
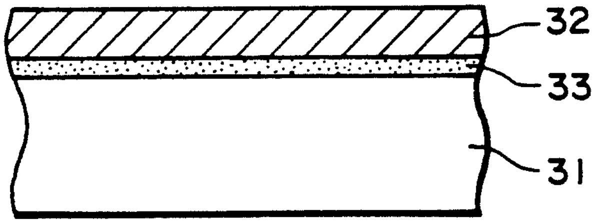

When a fixed toner image formed on a transfer material such as plain paper is observed with the eye, since a reflection image formed by light rays which have been incident on the fixed image and reflected therefrom is observed, the image quality is little affected even when somewhat particulate property remains on the toner image surface. However, in a case where a toner image is observed by using transmission light or projected onto a screen by means of an OHP, etc., when the particulate shapes due to toner particles clearly remain, the light-transmissivity deteriorates due to light scattering. Therefore, one object of the present invention is to provide a transparent laminate film which is capable of diminishing the particulate property of toner particles after fixing, increasing the light-transmissivity and suppressing an offset phenomenon at the time of fixing. FIG. 3A or 3B shows an embodiment of the transparent laminate film according to the present invention.

In FIG. 3A, the transparent laminate film of the present invention comprises a first transparent resin layer 31 as a base film, and a second transparent resin layer 32 disposed thereon. In FIG. 3B, the transparent laminate film comprises a first transparent resin layer 31, and an adhesive layer 33 and a second transparent resin layer 32 disposed in this order on the first transparent resin layer 31.

In FIGS. 3A and 3B, the first transparent resin layer 31 as a base film is required to have a heat-resistance, and it may preferably have a heat-resistance such that is does not cause considerable thermal distortion (or deformation) under heating at the time of heat fixing or heat and pressure fixing. The base film 31 may preferably have a heat distortion temperature of 145° C. or higher, more preferably 150° C. or higher, according to ASTM D 648 under the condition of a load of 4.6 Kg/cm$^2$. The heat distortion temperature used herein is a temperature at which a standard test bar (ASTM test)

deflects 0.254 mm under a load of 4.6 $kg/cm^2$ when heated at a temperature increasing rate of 2° C./min.

More specifically, the base film 31 may preferably comprise a resin such as polyethylene terephthalate (PET), polyamide resin, and polyimide, which has a heat distortion temperature of 145° C. or higher and a heat-resistance such that it has a maximum working temperature or continuous heat resistance temperature (JIS K 7201) of 100° C. or higher. Among these, polyethylene terephthalate is particularly preferred in view of heat-resistance and transparency.

The base film 31 may preferably have a thickness such that it is not wrinkled even when softened under heating at the time of fixing. More specifically, the base film 31 may preferably have a thickness of 50 microns or larger when the above-mentioned resins are used therefor. When the film thickness becomes too large, the light-transmissivity decreases even in the case of a transparent film. Accordingly, the base film 31 may preferably have thickness of 50–200 microns, more preferably 70–150 microns.

In FIGS. 3A and 3B, the reference numeral 32 denotes an overcoating or topcoat layer for forming a second transparent resin layer which is disposed in order to enhance the light-transmissivity of a color image after fixing. The second layer 32 may preferably be one having a compatibility with the binder resin of a toner constituting the color image at a temperature at which the toner is fixed under heating. The layer 32 may preferably have a compatibility with the binder resin of the toner so that the resin constituting the layer 32 and the toner resin do not form a visible boundary (or interface) therebetween in the resultant image after fixing.

As the standard for selecting such a resin, "solubility parameter", may be used. More specifically, in the present invention, the solubility parameter of the resin of the second layer 32 is in the range of $\pm 1.5$, more preferably $\pm 1.0$, on the basis of the solubility parameter of a main resin component used in a toner (i.e., a resin constituting 50 wt. % or more of the toner binder resin). The "solubility parameter" used herein is described in a publication such as J. Brandrup, E. H. Immergent, "Polymer Handbook" (Second Edition), John Wiley & Sons, 1975.

For example, when a polyester resin is used as the binder resin of a toner, since the solubility parameter thereof is ordinarily about 11.0, a resin having a solubility parameter in the range of $11.0 \pm 1.5$ may be used as the resin constituting the second layer 32. Specific examples of such a resin may include a thermoplastic resin such as polyester resins, polymethyl methacrylate resins, epoxy resins, polyurethane resins, vinyl chloride resins, and vinyl chloride-vinyl acetate copolymers. Particularly, the layer 32 may preferably comprise a resin of the same kind as the main resin component of the toner.

In the present invention, for example, the binder resin of a toner comprises a polyester resin, the second layer 32 may preferably comprise a polyester resin having a solubility parameter in the range of $\pm 1.0$ or smaller, on the basis of the solubility parameter of the polyester resin constituting the toner binder resin. Particularly, in the case of a polyester resin, both of the polyester resins constituting the toner binder resin and the second layer 32 may preferably comprise 50 mole % or more (based on the alcohol component, of a bisphenol-type alcohol. In a case where the toner binder resin comprises a styrene-type resin, the second layer 32 may preferably comprise a styrene-type resin having a solubility parameter in the range of $\pm 1.0$ or smaller, on the basis of the solubility parameter of the styrene-type resin constituting the toner binder resin. Particularly, in the case of a styrene-type resin, both of the styrene-type resins constituting the toner binder resin and the second layer 32 may preferably comprise 50 wt. % or more of a styrene component.

In the present invention, the resin of the same kind as the toner binder resin may preferably constitute 90 wt. % or more, more preferably 98 wt. % or more, of the second layer 32.

The resin used in the second layer 32 may preferably have a storage elasticity modulus (G') of 100–10,000 $dyne/cm^2$, more preferably 500–5,000 $dyne/cm^2$ at 160° C. In a case where a resin having a storage elasticity modulus (G') of below 100 $dyne/cm^2$ at 160° is used in the layer 32, an offset phenomenon is liable to occur when a toner image is fixed by means of a heat and pressure roller, and further the layer 32 is liable to be partially peeled from the base film 31 and to be broken. On the other hand, in a case where a resin having a storage elasticity modulus (G') of above 10,000 $dyne/cm^2$ at 160° C. is used in the layer 32, even when a toner image is fixed by means of a heat and pressure roller, the degree of penetration of the toner image into the layer 32 is very small, whereby the resultant projection image shows a gray tone a whole.

The storage elasticity modulus (G') of a resin used in the layer 32 may be measured by means of Dynamic Spectrometer RDS 7700 series II (mfd. by Rheometrics Inc.). The storage elasticity moduli (G') of the resin of the layer 32 and the binder descsribed in Examples appearing hereinafter resin are those measured by means of the above-mentioned measurement device. The second layer 32 may preferably have a thickness of 3–30 microns, more preferably 8–15 microns, while its optimum thickness can vary corresponding to the particle size of a toner to be fixed.

Next, there will be described a toner used in the image forming method of the present invention.

Generally speaking, a toner used in a color electrophotographic machine may preferably show a good-melting characteristic and a good color mixing characteristic when supplied with heat. Accordingly, such a toner may preferably be one having a low softening point, a low storage elasticity modulus at a fixing temperature, and a sharp melting characteristic.

In relation to the above-mentioned second layer 32 of a transparent laminate film, the toner may preferably have a storage elasticity modulus which is clearly smaller than that of the resin constituting the layer 32. More specifically, the toner used in the present invention may preferably have a storage elasticity modulus of 1–80 $dyne/cm^2$, more preferably 1–30 $dyne/cm^2$ at 160° C., in view of the adaptability to the transparent laminate film and the color mixing characteristic between toner particles. The storage elasticity modulus of the layer 32 may preferably be 5 to 1,000 times, more preferably 10 to 500 times, that of the toner or toner binder resin.

In the case of the formation of a color or full-color image, when a sharply meltable toner is used, color reproduction range for a copy may be enlarged, whereby a color copy faithful to the original multicolor or full-color image may be obtained satisfactorily.

In order to prepare a toner, materials for forming a toner, including a binder resin such as polyester resin and styrene-acrylic acid ester resin, a colorant such as dye, sublimable dye and pigment, and a charge control agent as desired, may be melt-kneaded, pulverized and classified. As desired, the resultant toner may be subjected to an external addition step, wherein various external additives (e.g., hydrophobic colloidal silica) are added to the toner.

In view of fixability and sharp melting characteristic, it is particularly preferred to use a polyester resin as the binder resin. Preferred examples of such a sharply meltable polyester resin may include a polymer compound which is synthesized from a diol compound and a dicarboxylic acid, and has an ester bond in its main chain.

In view of sharp melting characteristics, particularly preferred resins may be polyester resins obtained through polycondensation of at least a diol component selected from bisphenol derivatives represented by the formula:

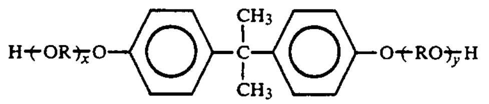

wherein R denotes an ethylene or propylene group; x and y are respectively a positive integer of 1 or more providing the sum (x+y) of 2 to 10 on an average and their substitution derivatives, and a two- or more-functioned carboxylic acid component or its anhydride or its lower alkyl ester, such as fumaric acid, maleic acid, maleic anhydride, phthalic acid, terephthalic acid, trimellitic acid, pyromellitic acid and mixtures thereof.

The polyester resin used in the present invention may preferably have a softening temperature of 75°-180° C., more preferably 80°-120° C.

Figure 2:
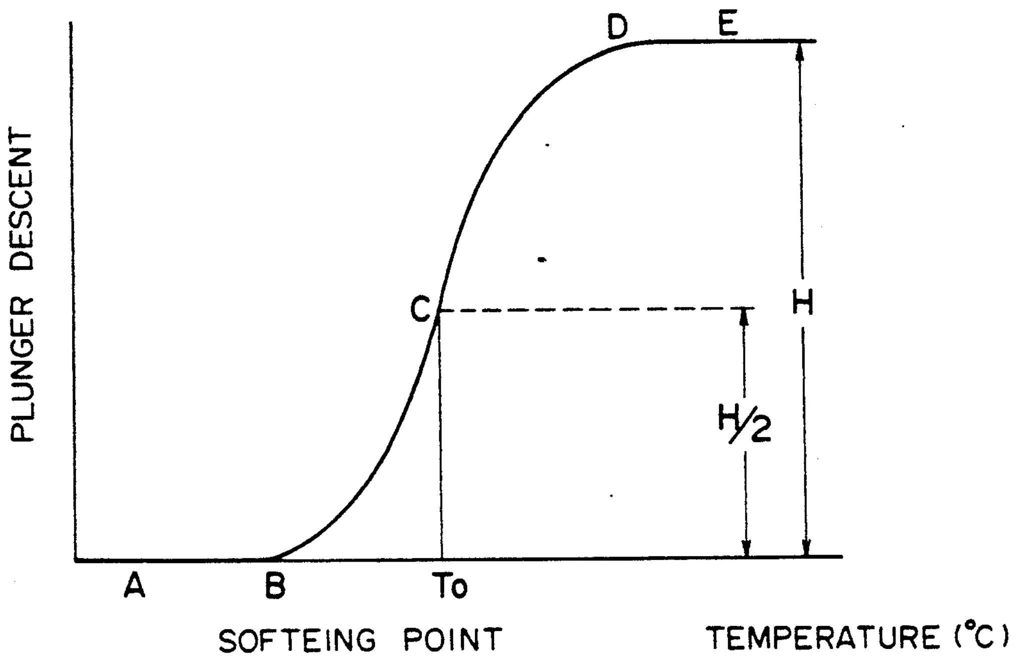
FIG. 2 is a graph for illustrating the melting characteristic of a toner used in the present invention.

FIG. 2 shows a softening characteristic of a toner comprising a polyester resin as a binder resin. Next, a method for measuring a softening point used in the present invention is described.

By using a Flow Tester Model: CFT-500A (mfd. by Shimazu Seisakusho K.K.) equipped with a die (or nozzle) having a diameter of 0.2 mm and a thickness (i.e., length of the nozzle) of 1 mm, an extrusion load of 20 Kg is applied to a sample. The sample is preliminarily heated at an initial set temperature of 70° C. for 300 sec., and thereafter is heated at a constant temperature increasing rate of 6° C./min, whereby a curve showing a temperature-plunger descent degree relationship (hereinafter, referred to as "S-shaped softening curve") is obtained with respect to the sample such as toner. The toner as a sample used herein is 1 to 3 g of fine powder which has been weighed accurately. The sectional area of the plunger used herein is 10 $cm^2$.

Based on the above-mentioned measurement, an S-shaped softening curve is obtained as shown in FIG. 2. As the temperature is elevated at a constant increasing rate, the toner is gradually heated and begins to flow out, whereby the plunger descends as shown by a curve A→B in FIG. 2. When the temperature is further elevated, the toner assuming a melting state considerably flows out as shown by a curve B→C→D in FIG. 2, and finally, the plunger stops descending as shown by a curve D→E.

The height H of the S-shaped curve represents the total flow amount and the temperature $T_0$ corresponding to the point C (i.e., a height of H/2) represents the softening temperature of the sample such as toner and resin.

Whether a toner or binder resin has a sharp melting characteristic may be determined by measuring an apparent melt viscosity of the toner or binder resin. More specifically, in the present invention, the toner or resin having a sharp melting characteristic may preferably be one satisfying the following relationships:

$$T_1 = 90° \text{ to } 150° \text{ C., and}$$

$$|\Delta T| = |T_1 - T_2| = 5° \text{ to } 20° \text{ C.,}$$

wherein $T_1$ denotes a temperature at which the toner or binder resin shows an apparent melt viscosity of $10^3$ poise, and $T_2$ denotes a temperature at which the toner or binder resin shows an apparent melt viscosity of $5\times10^2$ poise.

The apparent melt viscosity of the toner and binder resin may be measured by means of the above-mentioned Flow Tester CFT-500A under the same measurement conditions as those described above with respect to the softening point measurement.

With respect to the relationship between the toner and the transparent laminate film, the toner may preferably have a storage elasticity modulus at 160° which is clearly smaller than that of the resin used in the layer 32 of the transparent laminate film.

In the present invention, it is preferred that the transparent resin layer 32 shows a higher elasticity than that of the toner or binder resin at a fixing temperature (e.g., 130°-170° C.). In a case where the storage elasticity modulus of the transparent resin at the fixing temperature is close to that of the toner binder resin, a high-temperature offset phenomenon sometimes occurs. More specifically, when a portion at which a mono-color toner image is disposed and a portion at which toner images having two or more colors are overlapped are subjected to fixing by using one heat-fixing operation under the conditions such that these portions may provide sufficient light-transmissivity as an image for light transmission, the layer 32 is also heated sufficiently so as to decrease its elasticity, whereby the transparent resin layer 32 is liable to be separated from the base film 31 at the interface therebetween. As a result, the resultant image can partially be peeled by a hot fixing roller, and therefore the high-temperature offset phenomenon sometimes occurs.

When the storage elasticity modulus of the resin constituting the layer 32 is lower than that of the toner binder resin, a mono-color toner image can be fixed onto the layer 32. However, when color toner images having different colors are overlapped and fixed, the melt viscosity of the layer 32 becomes lower than the viscosity of the toner binder resin, whereby it is difficult to develop good color mixing.

With respect to the relationship between the toner and the transparent laminate film, in a case where the storage elasticity modulus of the layer 32 at a fixing temperature (e.g., 160° C.) is larger than 10,000 times that of the toner, practically acceptable light-transmissivity can be obtained when an image comprising a thin layer of a single species of toner particles is formed. In such a case, however, when a multi-color or full-color image, or a high-density image is formed, the layer 32 does not cause sufficient distortion at the time of fixing, whereby unevenness due to the thickness unevenness of the multi-layer toner image remains on the resultant image. As a result, the light-transmissivity tends to decrease. Further, since the adhesion between the layer 32 and the toner is poor, separation can occur in the toner layer, whereby an offset phenomenon can occur.

The thickness of the layer 32 can vary corresponding to the particle size of a toner used. However, in order to pass light through a low-density portion which has a thickness comparable to that of one toner particle, the thickness of the layer 32 may preferably be at least ½ times the average particle size of the toner. On the other hand, when the thickness of the layer 32 becomes three times or more the particle size of the toner, the amount of melted resin becomes large, whereby not only blurring or distortion of the image but also a crack in the image due to curvature occurs. In the present invention, it is particularly preferred that the thickness of the layer 32 is ½ to 2 times the volume-average particles size of the toner.

More specifically, when a toner having a volume-average particle size of 6 microns is used, a transparent laminate film having a layer 32 having a thickness of 3-12 microns may preferably be used. When a toner having a volume-average particle size of 15 microns is used, a transparent laminate film having a layer 32 having a thickness of 7.5-30 microns may preferably be used.

In the present invention, the average particle size of a toner may be measured in the following manner.

Coulter counter Model TA-II (available from Coulter Electronics Inc.) is used as an instrument for measurement, to which an interface (available from Nikkaki K.K.) for providing a number-basis distribution, a volume-basis distribution, a number-average particle size and a volume-average particle size, and a personal computer CX-1 (available from Canon K.K.) are connected.

For measurement, a 1%-NaCl aqueous solution as an electrolytic solution is prepared by using a reagent-grade sodium chloride. Into 100 to 150 ml of the electrolytic solution, 0.1 to 5 ml of a surfactant, preferably an alkylbenzenesulfonic acid salt, is added as a dispersant, and 0.5 to 50 mg, preferably 2 to 20 mg, of a sample is added thereto. The resultant dispersion of the sample in the electrolytic liquid is subjected to a dispersion treatment for about 1-3 minutes by means of an ultrasonic disperser, and then subjected to measurement of particle size distribution in the range of 2-40 microns by using the above-mentioned Coulter counter Model TA-II with a 100 micron-aperture to obtain a volume-basis distribution. From the results of the volume-basis distribution, a volume-average particle size is calculated.

The laminate film according to the present invention may be prepared in the following manner.

A resin for forming a layer 32 is dissolved in a volatile solvent including alcohols such as methanol and ethanol, ketones such as methyl ethyl ketone and acetone, and the resultant coating liquid is applied onto a transparent base film 31 by a method such as bar coating, dipping, spraying and spin coating, and dried. There may be disposed an adhesive layer 33 which has a compatibility with the base film 31 and the overcoating resin layer 32, has a high heat-resistance, and is not substantially melted under heating at the time of fixing, as shown in FIG. 3B. Such an adhesive layer 33 may enhance the adhesion between the layer 32 and the base film 31 and prevent the fixed toner image peeling from the base film 31 at the time of and after fixing.

Specific examples of a material used for the adhesive layer 33 may include resins such as polyester resins, acrylic acid ester resins, methacrylic acid ester resins, styrene-acrylic acid ester resins, and styrene-methacrylic acid ester resins.

Next, there is described a color image-forming method.

Figure 1:
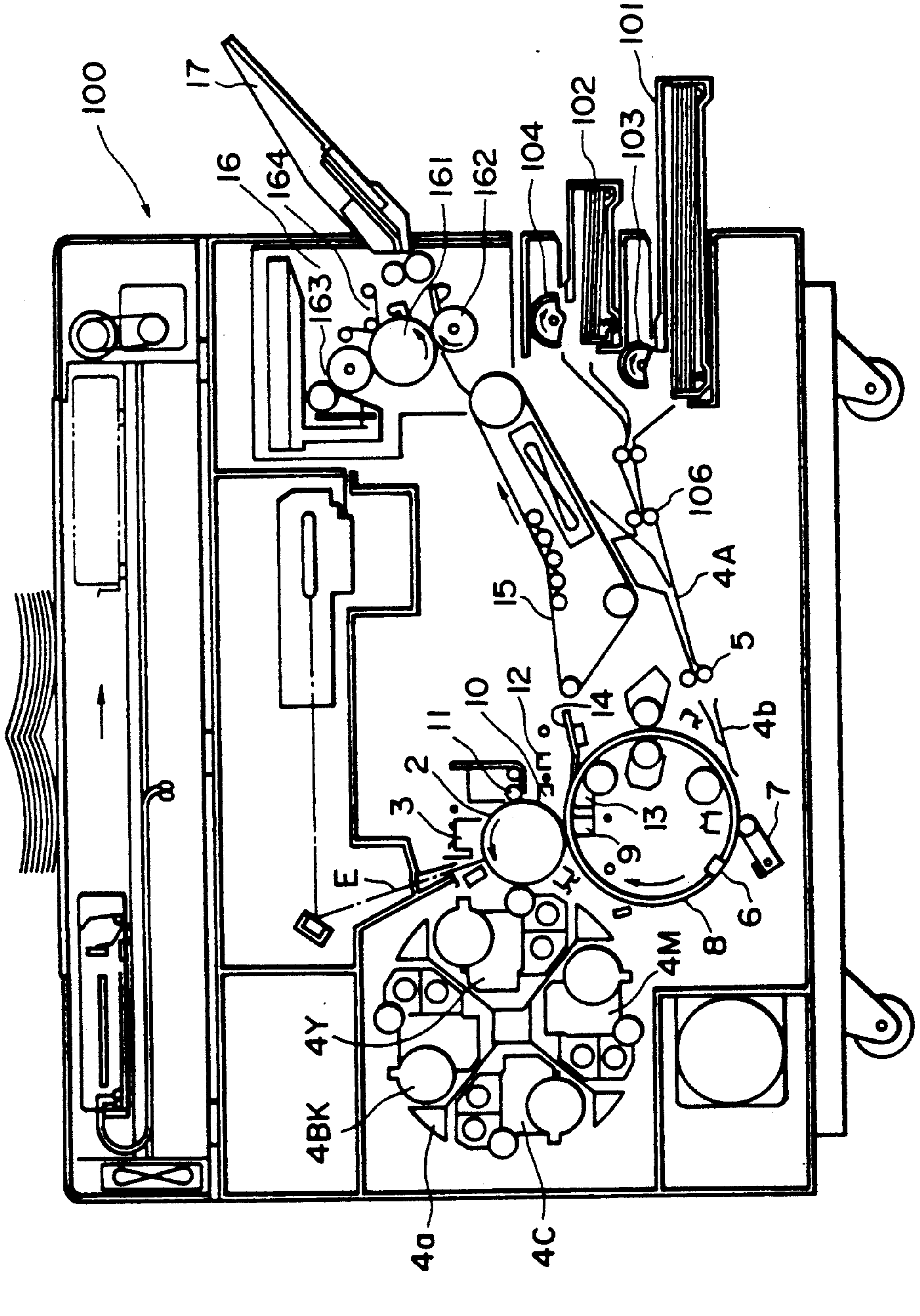
FIG. 1 is a schematic sectional view showing a full-color copying machine wherein the transparent laminate film according to the present invention is usable.

FIG. 1 is a schematic sectional view showing an electrophotographic apparatus which is capable of forming a full-color image according to the present invention. In FIG. 1, an apparatus body 100 is roughly divided into a transfer material-conveying system (I), a latent image-forming section (II), and a developing means (III). More specifically, the transfer material-conveying system (I) is disposed in a portion of from the right side of the apparatus body 100 (i.e., the right side of FIG. 1) to near the center thereof. The latent image-forming section (II) is disposed near the center of the apparatus body 100 and is disposed close to a transfer drum 8 constituting the above-mentioned transfer material-conveying system (I). The developing means (III) (i.e., a rotary developing device) is disposed near to the above-mentioned latent image-forming section (II).

In the transfer material-conveying system (I), there are disposed transfer material-feeding trays 101 and 102 which are removable from openings formed on the right side of the above-mentioned apparatus body 100 (i.e., the right side of FIG. 1), paper-feeding rollers 103 and 104 disposed above the trays 101 and 102, and paper-feeding guides 4A and **4*b* equipped with a paper-feeding roller 106**.

Close to the paper-feeding guide **4*b*, there is disposed a transfer drum 8 rotatable in the direction of an arrow shown in FIG. 1. Around the outer peripheral surface of the transfer drum 8, a contacting roller 7, gripper 6, a charger 12 for separating a transfer material, and a separation claw 14 are disposed in this order from the upstream side to the downstream side with respect to the moving direction of the transfer drum 8. Along the inner peripheral surface of the transfer drum 8, a transfer charger 9 and a charger 13 for separating the transfer material are disposed in this order from the upstream side to the downstream side with respect to the moving direction of the transfer drum 8**.

Further, conveying belt means 15 is disposed close to the above-mentioned separation claw 14, and a fixing device 16 is disposed close to the trailing end of the conveying belt means 15. Close to the fixing device 16, there is disposed a discharge tray 17 which extends from the apparatus body 100 and is removable from the apparatus body 100.

The latent image-forming section (II) comprises an image-carrying member (i.e., photosensitive drum) 2, a charger 10 for removing charges, cleaning means 11, a primary charger 3, and image exposure means. The photosensitive drum 2 is disposed so that its peripheral surface contacts the peripheral surface of the transfer drum 8, and is rotatable in the direction of an arrow shown in FIG. 1. In the neighborhood of the peripheral surface of the photosensitive drum 2, the charger 10, the cleaning means 11, the primary charger 3, and the image exposure means for forming an electrostatic latent image on the peripheral surface of the photosensitive drum 2, are disposed in this order from the upstream side to the downstream side with respect to the moving direction of the photosensitive drum 2. The image exposure means comprises exposure means such as laser beam scanner and reflecting means such as polygon mirror.

The rotary developing device (III) comprises a rotatable box-like member (hereinafter, referred to as "rotation body") 4*a*, and a yellow developing device 4Y, a magenta developing device 4M, a cyan developing device 4C and a black developing device 4BK, disposed on the rotation body 4*a*, so that it may visualize or develop an electrostatic latent image formed on the peripheral surface of the photosensitive drum 2 at a position where the rotary developing device is disposed opposite to the peripheral surface of the photosensitive drum 2.

The sequence for the whole of the above-mentioned image forming apparatus is described with respect to a full-color mode.

Referring to FIG. 1, when the photosensitive drum 2 rotates in the direction of an arrow shown in the figure, the photosensitive material disposed on the drum 2 is uniformly charged by means of the primary charger 3. The drum 2 is then imagewise exposed to laser light E modulated according to a "yellow" image signal from an original (not shown), to form thereon an electrostatic latent image, which is then developed by means of the yellow developing device 4Y which has preliminarily been disposed at a developing position where the drum 2 is disposed opposite thereto, thereby to effect development.

On the other hand, a transfer paper (or transfer-receiving paper) is fed to a gripper 6 through the medium of a paper feeding guide 4A, a paper feeding roller 106 and a paper feeding guide 4*b*. The transfer paper is held by the gripper 6 in synchronism with a prescribed timing, and is electrostatically wound around a transfer drum 8 by means of a contact roller 7 and an electrode disposed opposite thereto. The transfer drum 8 is rotated in the direction of an arrow shown in the figure in synchronism with the rotation of the photosensitive drum 2.

At a transfer position where the peripheral surface of the transfer drum 8 is disposed opposite to the peripheral surface of the photosensitive drum 2, the yellow image developed by the yellow developing device 4Y in the above-mentioned manner is transferred from the photosensitive drum 2 to the transfer paper disposed on the transfer drum 8, by means of the transfer charger 9. The transfer drum 8 continues its rotation as such and provides for transfer of the next color (e.g., a magenta color in the embodiment shown in FIG. 1).

On the other hand, the photosensitive drum 2 is discharged by means of the charger 10, and cleaned by cleaning means 11. Thereafter, the drum 2 is again charged by means of the primary charger 3, and exposed to light modulated according to a "magenta" image signal in the same manner as described above. During such operation wherein an electrostatic latent image is formed on the photosensitive drum 2 by the above-mentioned image exposure, the above-mentioned rotary developing device is rotated to dispose the magenta developing device 4M at the developing position, whereby prescribed "magenta" development is conducted. Then, the above-mentioned procedure is repeated with respect to cyan and black colors.

When the respective transfer operations for the four colors are completed, the transfer paper having thereon the developed image comprising the four colors is discharged by means of chargers 12 and 13 and is released from the above-mentioned gripper 6 and separated from the transfer drum 8 by means of the separation claw 14. Then, the thus separated transfer paper is conveyed to a fixing device 16 by the conveyer belt 15, whereby a series of full-color print sequence is completed and a desired full-color print image is formed.

The fixing device 16 comprises a heating fixing roller 161, a pressure roller 162 and application means 163 for supplying a silicone oil to the heating fixing roller 161. The heating roller 161 may preferably have a surface layer comprising a material excellent in releasability such as silicone rubber. The surface layer of the pressure roller 162 may preferably comprise a fluorine-containing resin.

Hereinbelow, the present invention is more specifically explained with reference to specific Examples and Comparative Examples.

EXAMPLE 1

A polyester resin $P_1$ (solubility parameter: about 11 predominantly comprising a terephthalic acid component and a bisphenol A-type dialcohol component) having a storage elasticity modulus (G') of 1,000 dyne/cm$^2$ at 160° C. and a softening point of 116° C. was dissolved in acetone. The resultant solution was applied onto a biaxially oriented 100 micron-thick polyethylene terephthalate (PET) film having a heat distortion temperature of 152° C. and a maximum working temperature of 150° C., by a bar-coating method, and then dried to form an overcoating layer having a thickness of 16 microns after drying, whereby a transparent laminate film ($F_1$, A-4 size) was obtained.

Separately, there was provided a polyester resin $P_2$ (solubility parameter: 11, predominantly comprising a fumaric acid component and a bisphenol A-type dialcohol component) having a storage elasticity modulus (G') of 8 dyne/cm$^2$ at 160° C. and softening point of 105° C. This polyester resin $P_2$ had a temperature $T_1$ of 123° C. at which it showed an apparent melt viscosity of $10^3$ poise and had a temperature $T_2$ of 131° C. at which it showed an apparent melt viscosity of $5\times10^2$ poise, and therefore it showed a sharp melting property because $|T_1-T_2|=8°$ C.

100 wt. parts of the above-mentioned polyester resin $P_2$, 3.5 wt. parts of a yellow colorant (C.I. Pigment Yellow 17), and 4 wt. parts of a chromium-containing organic complex (chromium complex of dialkylsalicylic acid) were melt-kneaded, pulverized and classified to prepare a yellow toner having a volume-average particle size of 12 microns. The thus obtained yellow toner had a storage elasticity modulus (G') of 10 dyne/cm$^2$ at 160° C., softening point of 107° C., a temperature $T_1$ of 125° C. at which it showed an apparent melt viscosity of $10^3$ poise and had a temperature $T_2$ of 134° C. at which it showed an apparent melt viscosity of $5\times10^2$ poise, and therefore it showed a sharp melting property because $|T_1-T_2|=9°$ C.

0.4 wt. % of hydrophobic colloidal silica was externally added to the yellow toner, and 4 wt. parts of the resultant yellow toner was mixed with 100 parts of ferrite carrier having an average particle size of about 50 microns coated with resin (a mixture of a fluorine-containing resin and a styrene-type resin) to prepare a developer. The thus obtained developer was charged in an image-forming apparatus as shown in FIG. 1, wherein the surface layer of a heating fixing roller 161 comprised a silicone rubber and the surface layer of a pressure roller 162 comprised a fluorine-containing resin.

By using the image forming apparatus, an unfixed yellow toner image (solid image) was formed on the photosensitive drum 2 so that it might provide a fixed image having an image density of 1.5 according to a Macbeth reflection densitometer, and the resultant toner image was transferred to the transparent laminate film $F_1$. The unfixed toner image was then fixed under heat and pressure by means of a heat-and-pressure fixing device wherein a dimethylsilicone oil (100 cs) as a releasing agent was applied onto the heating fixing roller, under the conditions such that the temperature of the heating fixing roller was 160° C., an average heating time was 25 msec, and pressing force was 3 Kg/cm$^2$. As a result, a fixed yellow toner image was formed on the transparent laminate film $F_1$. The fixed image was then observed and subjected to visible spectrum measurement by using transmission light passing therethrough.

Figure 4A:
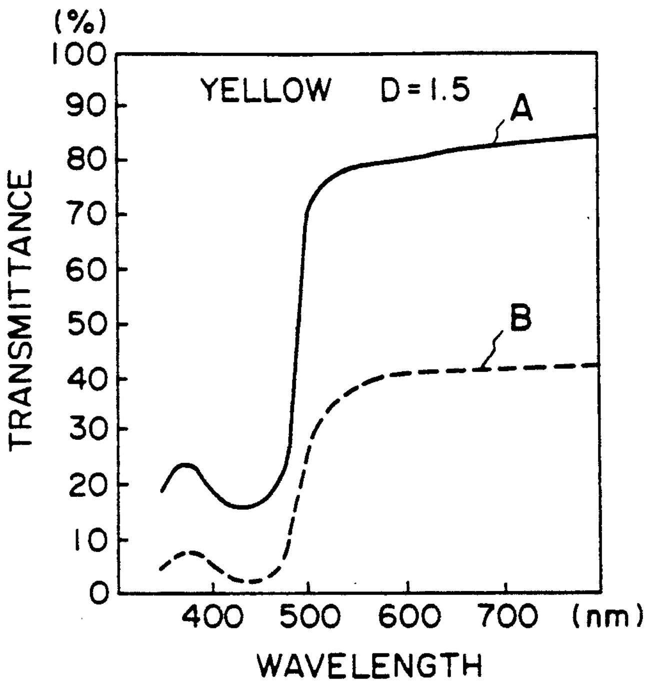
FIGS. 4A to 4F are graphs showing transmission visible spectral characteristics of transparent films obtained in Examples and Comparative Examples appearing hereinafter.

The results of the visible spectrum measurement are shown by a solid line A in FIG. 4A. As shown in FIG. 4A, the yellow color image prepared by using the transparent laminate film according to the present invention showed a transmittance of 70% or larger in the range of not shorter than 500 nm, and showed a difference of about 50% or more in transmittance with the absorption in the range of not longer than 450 nm. As a result, it was found that clear yellow transmission light was obtained.

COMPARATIVE EXAMPLE 1

A fixed yellow toner image was formed on a transparent film in the same manner as in Example 1 except that a transparent film ($F_2$) comprising a base film 31 not having an overcoating layer 32 (i.e., a PET film) per se was used as a transparent film.

The fixed yellow toner color image was observed and subjected to visible spectrum measurement by using transmission light in the same manner as in Example 1. The results of the visible spectrum measurement are shown by a broken line B in FIG. 4A. As shown in FIG. 4A, the transmittance in the range of not shorter than 500 nm was as low as about 50%, and the difference with the absorption in the range of not longer than 450 nm was as small as about 35%. As a result, it was found that the image obtained in this instance showed a blackish yellow color.

EXAMPLE 2

A magenta toner having a volume-average particle size of 12 microns was prepared in the same manner as in Example 1 except that 1.9 wt. parts of a magenta colorant (a 1:1 mixture of C.I. Pigment Red 52 and C.I. Pigment Red 49) was used as the colorant. The thus obtained magenta toner had a storage elasticity modulus (G') of 8 dyne/cm$^2$ at 160° C., softening point of 106° C., a temperature $T_1$ of 124° C. at which it showed an apparent melt viscosity of $10^3$ poise and had a temperature $T_2$ of 133° C. at which it showed an apparent melt viscosity of $5\times10^2$ poise, and therefore it showed a sharp melting property because $|T_1-T_2|=9°$ C.

A magenta toner image having an image density of 1.5 was formed by using the above-mentioned sharply meltable magenta toner in the same manner as in Example 1, and the resultant toner image was transferred to a transparent laminate film ($F_1$) the same as that used in Example 1, and fixed thereon.

Figure 4B:
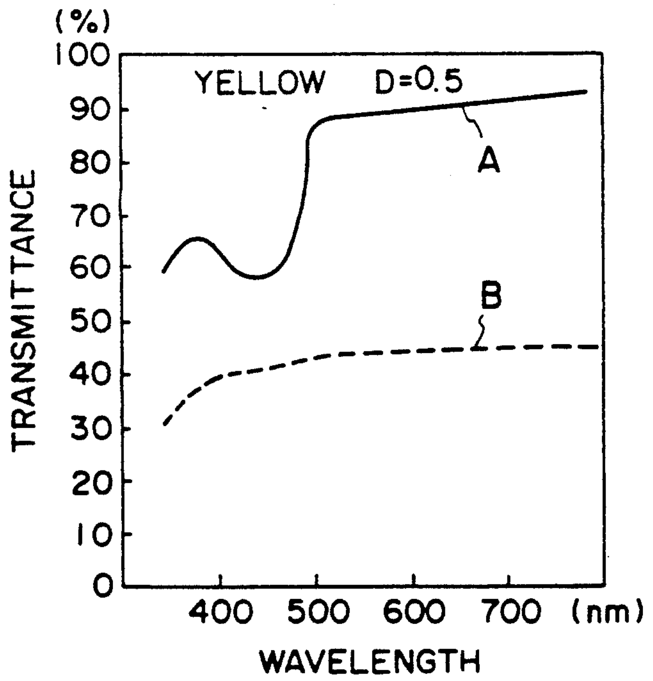
Figure 4C:
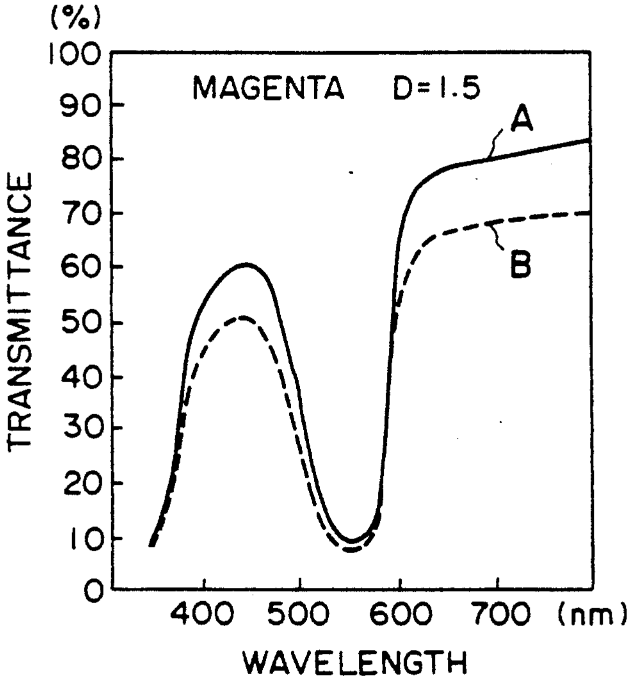

The results of the transmittance spectrum measurement of the magenta color image prepared by using the transparent laminate film ($F_1$) according to the present invention are shown by a solid line A in FIG. 4C.

COMPARATIVE EXAMPLE 2

A fixed magenta toner image was formed on a transparent film in the same manner as in Example 2 except that a transparent film ($F_2$) comprising a base film 31 not having an overcoating layer 32 per se was used as the transparent film.

The results of the transmittance spectrum measurement of the resultant magenta toner image are shown by a broken line B in FIG. 4C.

EXAMPLE 3

A cyan toner having a volume-average particle size of 12 microns was prepared in the same manner as in Example 1 except that 5.0 wt. parts of a cyan colorant (phthalocyanine-type pigment) was used as the colorant. The thus obtained cyan toner had a storage elasticity modulus (G') of 10 dyne/cm$^2$ at 160° C., softening point of 180° C., a temperature $T_1$ of 127° C. at which it showed an apparent melt viscosity of $10^3$ poise and had a temperature $T_2$ of 137° C. at which it showed an apparent melt viscosity of $5\times10^2$ poise, and therefore it showed a sharp melting property because $|T_1-T_2|=10°$ C.

A cyan toner image having an image density of 1.5 was formed by using the above-mentioned sharply meltable cyan toner in the same manner as in Example 1, and the resultant toner image was transferred to a transparent laminate film ($F_1$) the same as that used in Example 1, and fixed thereon.

Figure 4D:
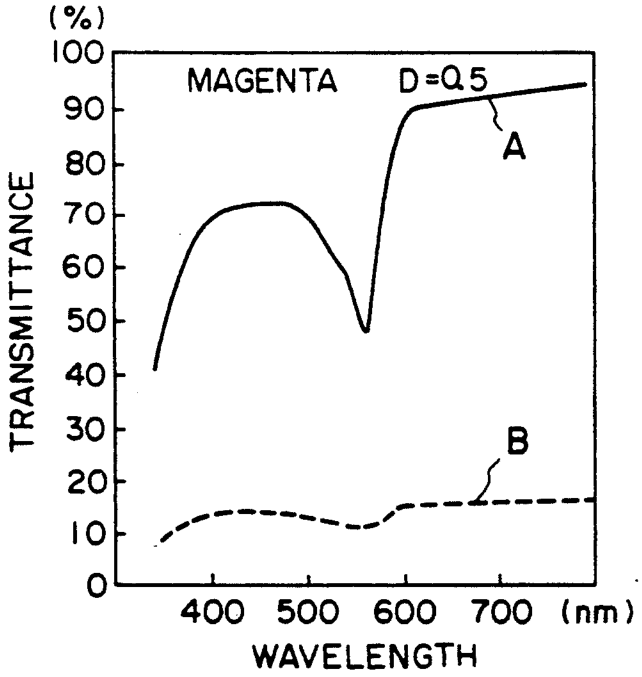
Figure 4E:
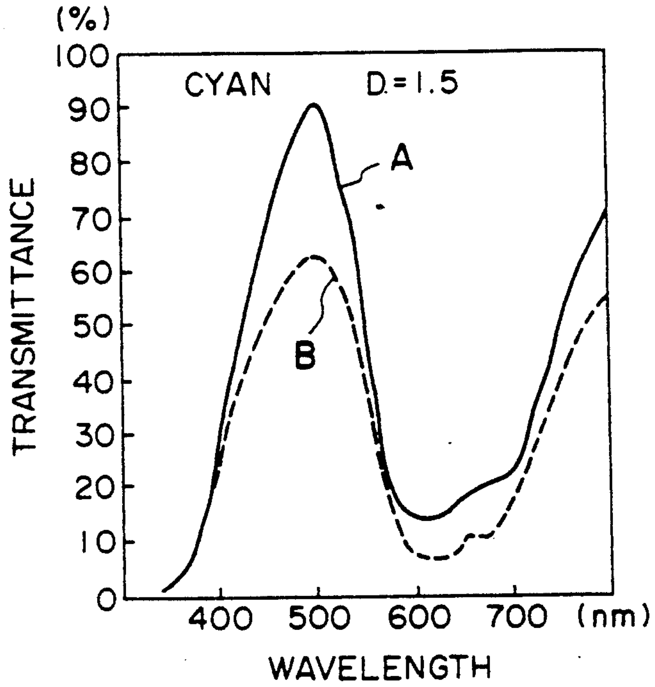

The results of the transmittance spectrum measurement of the cyan color image prepared by using the transparent laminate film ($F_1$) according to the present invention are shown by a solid line A in FIG. 4E.

COMPARATIVE EXAMPLE 3

A fixed cyan toner image was formed on a transparent film in the same manner as in Example 3 except that a transparent film ($F_2$) comprising a base film 31 not having an overcoating layer 32 per se was used as a transparent film.

The results of the transmitatnce spectrum measurement of the resultant cyan toner image are shown by a broken line B in FIG. 4E.

EXAMPLE 4

An epoxy resin $P_3$ predominantly comprising a bisphenol A-type dialcohol component and epichlorohydrin (solubility parameter: about 10.5, weight-average molecular weight: 20,000) having a storage elasticity modulus (G') of 800 dyne/cm$^2$ at 160° C. and a softening point of 114° C. was dissolved in methyl ethyl ketone. The resultant solution was applied onto a PET film the same as that used in Example 1 to form an overcoating layer 32, whereby a transparent laminate film ($F_3$) was prepared.

A fixed yellow color toner image having an image density of 0.5 was formed on the transparent laminate film ($F_3$) prepared above by using the yellow toner prepared in Example 1 in the same manner as in Example 1. The results of the transmittance spectrum measurement of the yellow toner image are shown by a solid line A in FIG. 4B.

COMPARATIVE EXAMPLE 4

A fixed yellow toner image was formed on a transparent film in the same manner as in Example 4 except that a transparent film ($F_2$) comprising a base film 31 not having an overcoating layer 32 (i.e., a PET film) per se was used as a transparent film.

The results of the transmittance spectrum measurement of the resultant yellow toner image are shown by a broken line B in FIG. 4B.

With respect to the solid line A in FIG. 4B (Example 4), the yellow color image prepared by using the transparent laminate film according to the present invention showed a transmittance of 80–90% in the range of not shorter than 500 nm, and showed a difference of about 30% in transmittance with the absorption in the range of not longer than 450 nm. As a result, it was found that the resultant toner image showed a bright intermediate-tone yellow image.

On the other hand, with respect to the broken line B in FIG. 4B (Comparative Example 4), the toner image showed a transmittance of about 40% in the range of not shorter than 500 nm, and showed substantially no difference in transmittance with the absorption in the range of not longer than 450 nm. As a result, substantially no yellow color could be observed from the toner image, whereby it showed a gray color.

EXAMPLE 5

A fixed magenta color toner image having an image density of 0.5 (fixed image) was formed on a transparent laminate film ($F_3$) in the same manner as in Example 4 except that the magenta toner prepared in Example 2 was used. The results of the transmittance spectrum measurement of the magenta color image are shown by a solid line A in FIG. 4D.

COMPARATIVE EXAMPLE 5

A fixed magenta toner image was formed on a transparent film in the same manner as in Example 5 except that a transparent film ($F_2$) comprising a base film 31 not having an overcoating layer 32 (i.e., a PET film) per se was used as a transparent film. The results of the transmittance spectrum measurement of the magenta toner image are shown by a broken line B in FIG. 4D.

EXAMPLE 6

Figure 4F:
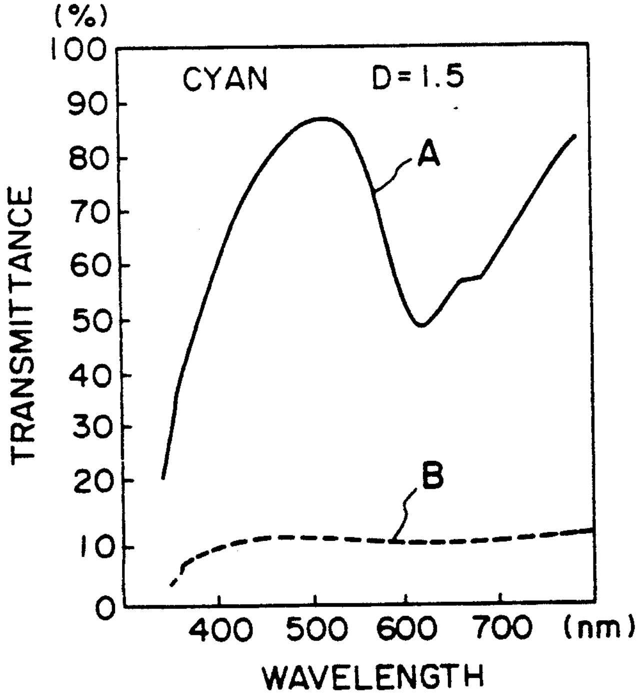

A fixed cyan color toner image having an image density of 0.5 (fixed image) was formed on a transparent laminate film ($F_3$) in the same manner as in Example 4 except that the cyan toner prepared in Example 3 was used. The results of the transmittance spectrum measurement of the cyan color image are shown by a solid line A in FIG. 4F.

COMPARATIVE EXAMPLE 6

A fixed cyan cyan toner image was formed on a transparent film in the same manner as in Example 6 except that a transparent film ($F_2$) comprising a base film 31 not having an overcoating layer 32 (i.e., a PET film) per se was used as a transparent film. The results of the transmittance spectrum measurement of the cyan toner image are shown by a broken line B in FIG. 4F.

With respect to the difference between Example 5 and Comparative Example 5, and between Example 6 and Comparative Example 6, there was observed a difference which was similar to that described with respect to the above-mentioned yellow image.

Figure 5A:
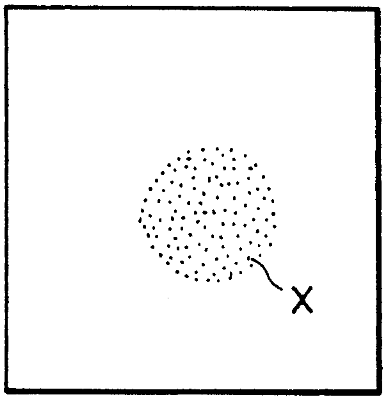
FIGS. 5A to 5D are schematic planar and sectional views obtained by microscopic observation, which show a transparent laminate film or a transparent film having a fixed toner image obtained in Examples and Comparative Examples appearing hereinafter.
Figure 5C:
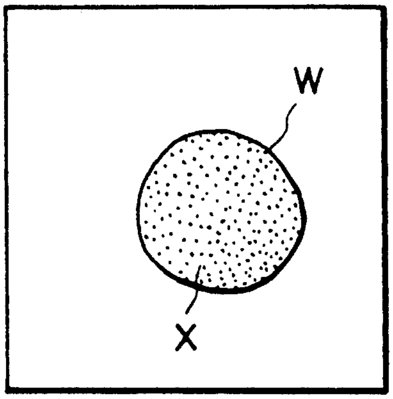
Figure 5B:
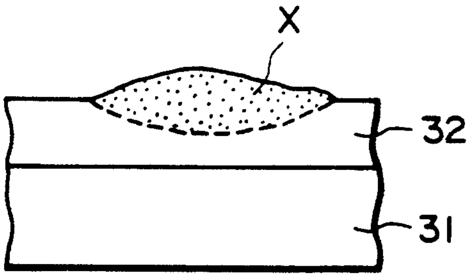

When the images obtained in the above-mentioned Examples according to the present invention were observed by means of an optical microscope (magnification: 100), the boundary between the toner particles and the layer 32 was not substantially observed, as shown in the plan view of FIG. 5A. It was found that such pigment x was dispersed in the thin layer 32. The sectional view of FIG. 5B is one obtained through microscopic observation in the same manner as described above. It was found that the toner was wetted with the thin layer 32 and was partially dissolved in the thin layer 32.

Figure 5D:
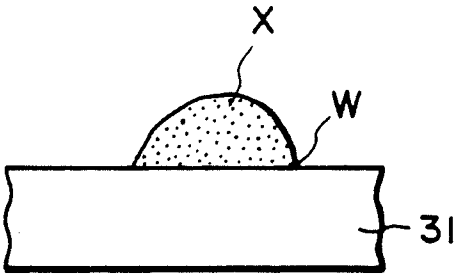

Next, the fixed images obtained in the above-mentioned Comparative Examples were observed by means of a microscope. As a result, as the amount of the toner attached to the film became smaller, clearer boundary W between the toner and the film was observed, as shown in the schematic plan view of FIG. 5C. In this case, since the section of the film assumed a convex lens-like shape as shown in the sectional view of FIG. 5D, the light used in an OHP optical system was scattered by such a portion to deviate from the optical path. As a result, such a toner image could not provide a predetermined color but darkened the image.

The above-mentioned results may also be clarified by those shown by the respective graphs in FIGS. 4A to 4F.

EXAMPLES 7 to 9

A fixed yellow toner image, a fixed magenta image, and a fixed cyan image having an image density of 0.5 were formed on a transparent film in the same manners as in Examples 4 to 6, respectively, except that a transparent laminate film ($F_1$) having a coating layer 32 of polyester resin used in Example 1 was used as the transparent film. Since the transparent laminate film ($F_1$) used herein had a layer 32 of the polyester resin which was the same species as the binder resin of the toner, the resultant transmittances were superior to those obtained in Examples 4 to 6.

EXAMPLE 10

A sharply meltable polyester resin obtained by polycondensation of propoxidized bisphenol and fumaric acid was used as a binder resin for toner. Physical properties of the polyester resin are shown in the following Table 1.

TABLE 1

| Storage elasticity modulus at 160° C. (G') | Softening point | $T_1$ | $T_2$ | $\|T_1-T_2\|$ | Solubility parameter |
|---|---|---|---|---|---|
| 20 dyn/cm$^2$ | 106° C. | 125° C. | 132° C. | 7° C. | about 11 |

Toners having four colors were respectively prepared by using 100 wt. parts of the above-mentioned polyester resin and material shown in the following Table 2.

TABLE 2

| Toner | Colorant Name | Colorant wt. parts | Wt. parts of charge control agent *1 |
|---|---|---|---|
| Yellow | C.I. Pigment Yellow 17 | 3.5 | 4.0 |
| Magenta | C.I. Solvent Red 52 | 1.0 | 4.0 |
| | C.I. Solvent Red 49 | 0.9 | |
| Cyan | Phthalocyanine pigment | 5.0 | 4.4 |
| Black | C.I. Pigment Yellow 17 | 1.2 | |
| | C.I. Pigment Red 5 | 2.8 | |

TABLE 2-continued

| Toner | Colorant Name | Colorant wt. parts | Wt. parts of charge control agent *1 |
|---|---|---|---|
| | C.I. Pigment Blue 15 | 1.5 | 4.4 |

*1: Chromium-containing organic complex (chromium complex of an alkylsalicylic acid)

Physical properties of the respective color toners are shown in the following Table 3.

TABLE 3

| Toner | Storage elasticity modulus at 160° C. | softening point | $T_1$ (°C.) | $T_2$ (°C.) | $\|T_1-T_2\|$ (°C.) |
|---|---|---|---|---|---|
| Yellow | 22 dyn/cm² | 109 | 127 | 136 | 9 |
| Magenta | 21 dyn/cm² | 108 | 126 | 134 | 8 |
| Cyan | 22 dyn/cm² | 109 | 127 | 136 | 9 |
| Black | 22 dyn/cm² | 109 | 127 | 136 | 9 |

0.5 wt. part of hydrophobic colloidal silica was externally added to each of the above-mentioned toners. By using developers each comprising the thus obtained toner and ferrite carrier coated with resin, a fixed full-color toner image was formed on a transparent laminate film ($F_1$) used in Example 1 by means of an image forming apparatus shown in FIG. 1 in the same manner as in Example 1. When the resultant transparent film ($F_1$) having the fixed full-color toner image was used as the transparency for an OHP, a high-definition full-color image was projected on a screen.

EXAMPLE 11, AND COMPARATIVE EXAMPLES 7 and 8

The above-mentioned transparent laminate film ($F_1$), transparent film ($F_2$), and a transparent laminate film ($F_4$) having a 16 micron-thick layer 32 which comprised the polyester resin which had been used in Example 10 as the binder resin, were used as OHP films.

A multi-color image was formed on the above-mentioned transparent films by using yellow, magenta, cyan and black toners in the same manner as in Example 10. The resultant multi-color image was fixed on the film under each set of the fixing conditions as shown in the following Table 4 to effect color mixing, whereby a fixing test was conducted.

TABLE 4

| | Temperature of heating fixing roller | Average heating time | Pressing force | Application of dimethylsilicone oil |
|---|---|---|---|---|
| Fixing condition (I) | 160° C. | 25 msec | 3 kg/cm² | No application |
| Fixing condition (II) | 160° C. | 40 msec | 3 kg/cm² | Application was effected. |

The results of the fixing test are shown in the following Table 5.

TABLE 5

| Example | Transparent film | Fixing condition (I) | Fixing condition (II) |
|---|---|---|---|
| Example 11 | $F_1$ | Offset phenomenon was not observed. | Offset phenomenon was not observed. |
| Comparative Example 7 | $F_2$ | Offset phenomenon was observed in the whole image. | Offset phenomenon was partially observed (on a higher density side). |
| Comparative Example 8 | $F_4$ | Offset phenomenon was partially observed, and the laminate layer 32 was partially broken. | Offset phenomenon was observed in the whole image. |

From the above Table 5, it was found that the transparent laminate film according to the present invention showed an excellent fixing stability.

As described hereinabove, according to the present invention, there is provided a transparent film comprising a transparent film and a resin layer disposed thereon comprising a resin which is compatible with the binder resin of a toner and has a higher elasticity than that of the toner binder resin at the fixing temperature of the toner. When the transparent laminate film according to the present invention is used, the boundaries between the toner particles and the resin layer disappear and factor of irregular reflection is reduced, whereby color reproducibility is improved when a full-color image is projected by using transmission light.

Further, according to the present invention, offset phenomenon is reduced with respect to a fixing roller, whereby a stable image is provided.

What is claimed is:

1. A transparent laminate film adapted to receive a color toner image from a toner comprising at least a binder resin and a chromatic colorant and useful in an overhead projector, comprising:

at least a first transparent resin layer comprising a heat-resistant first transparent resin, and a second transparent resin layer disposed thereon comprising a second transparent resin; said second transparent resin of the second transparent resin layer being compatible with said binder resin of said toner to be fixed thereon at a fixing temperature of said toner, wherein said second transparent resin and said binder resin being compatible do not form a visible boundary in a resultant toner image after fixing, and said second transparent resin has an elasticity 5 to 1000 times that of the binder resin of the toner at a fixing temperature of the toner so as to provide a relief fixed toner image on the second layer after fixing; wherein (i) said first transparent resin of said first transparent resin layer has a heat distortion temperature of at least 145° C., wherein said transparent resin is resin selected from the group consisting of polyethylene terephthalate, polyamide and polyimide; and (ii) said second transparent resin of said second transparent resin has a storage elasticity modulus of 100–10,000 dyne/cm² at 160° C.

2. A laminate film according to claim 1, wherein said second transparent resin layer comprises a resin having a solubility parameter of 9.5–12.5 $(cal/cm^3)^{\frac{1}{2}}$.

3. A laminate film according to claim 1, wherein said first transparent resin layer has a thickness of 50–200 microns, and said second transparent resin layer has a thickness of 3–30 microns.

4. A laminate film according to claim 1, wherein said first transparent resin layer has a thickness of 70–150 microns, and said second transparent resin layer has a thickness of 8–15 microns.

5. A laminate film according to claim 1, wherein said first transparent resin layer comprises a polyethylene terephthalate resin and said second transparent resin layer comprises a resin having a storage elasticity modulus of 500–5,000 dyne/cm$^2$ at 160° C.

6. A laminate film according to claim 5, wherein said second transparent resin layer comprises a polyester resin.

7. A laminate film according to claim 5, wherein said second transparent resin layer comprises an epoxy resin.

8. A transparent laminate capable of receiving a color toner image and useful in an overhead projector, comprising:

a first transparent resin layer comprising a heat-resistant first transparent resin having a heat distortion temperature of at least 145° C., wherein said first transparent resin is a resin selected from the group consisting of polyethylene terephthalate, polyamide and polyimide and a second transparent resin layer disposed thereon comprising a second transparent resin; said second transparent resin of the second transparent resin layer having a solubility parameter of 9.5–12.5 (cal/cm$^3$)$^{\frac{1}{2}}$, storage elasticity modulus (G') of 100–10,000 dyne/cm$^2$ at 160° C. and an elasticity 5 to 1,000 times that of the binder resin of the toner at the fixing temperature at the toner, so as to provide a relief, fixed toner image on the second layer after fixing.

9. A laminate film according to claim 8, wherein said first transparent resin layer has a thickness of 50–200 microns, and said second transparent resin layer has a thickness of 3–30 microns.

10. A laminate film according to claim 8, wherein said first transparent resin layer has a thickness of 70–150 microns, and said second transparent resin layer has a thickness of 8–15 microns.

11. A laminate film according to claim 8, wherein said first transparent resin layer comprises polyethylene terephthalate and said second transparent resin layer comprises a resin having a storage elasticity modulus of 500–5,000 dyne/cm$^2$ at 160° C.

12. A laminate film according to claim 11, wherein said second transparent resin layer comprises a polyester resin.

13. A laminate film according to claim 11, wherein said second transparent resin layer comprises an epoxy resin.

14. A transparent laminate film adapted to receive a toner image and useful in an overhead projector, comprising:

a least a first transparent resin layer containing a heat-resistant first transparent resin, and a second transparent resin layer disposed thereon comprising a second transparent resin; said second transparent resin of the second transparent resin layer being compatible with a binder resin of said toner to be fixed thereon at a fixing temperature of said toner, wherein said second transparent resin and said binder resin being compatible do not form a visible boundary in a resultant toner image after fixing; wherein (i) said first transparent resin of said first transparent resin layer has a heat distortion temperature of at least 145° C. wherein said first transparent resin is a resin selected from the group consisting of polyethylene terephthalate, polyamide and polyimide; and (ii) said second transparent resin of said second transparent resin layer has a storage elasticity modulus which is 5 to 1,000 times that of said toner at 160° C. so as to provide a relief, fixed toner image on the second resin layer after fixing.

15. A laminate film according to claim 14, wherein said first transparent resin comprises polyethylene terephthalate, said second transparent resin comprises a bisphenol A-type dihydroxy component and said toner comprises at least a polyester binder resin having a bisphenol A-type dihydroxy component and a chromatic colorant.

16. A laminate film according to claim 15, wherein the second transparent resin has a storage elasticity modulus of 100–10,000 dyne/cm$^2$ at 160° C.

* * * * *

UNITED STATES PATENT AND TRADEMARK OFFICE

CERTIFICATE OF CORRECTION

PATENT NO. : 5,229,188

DATED : July 20, 1993

INVENTOR(S) : TATSUO TAKEUCHI, ET AL.

It is certified that error appears in the above-identified patent and that said Letters Patent is hereby corrected as shown below:

IN [57] ABSTRACT

Line 7, "large" should read --larger--.

On drawing
SHEET 2 OF 6

FIG. 2, "SOFTEING" should read --SOFTENING--.

COLUMN 3

Line 11, "are" should read --is--.
Line 19, "large" should read --larger--.

COLUMN 5

Lines 67, "alcohol" should read --alcohol)--.

COLUMN 6

Line 34, "descsribed" should read --described--.
Line 35, "resin" should be deleted.

COLUMN 14

Line 46, "transmitatnce" should read --transmittance--.

COLUMN 18

Line 53, "resin" should read --resin layer--.

--

UNITED STATES PATENT AND TRADEMARK OFFICE

CERTIFICATE OF CORRECTION

PATENT NO. : 5,229,188

DATED : July 20, 1993

INVENTOR(S) : TATSUO TAKEUCHI, ET AL.

It is certified that error appears in the above-identified patent and that said Letters Patent is hereby corrected as shown below:

COLUMN 20

Line 10, "a least" should read --at least--.

Signed and Sealed this

Twelfth Day of April, 1994

Attest:

BRUCE LEHMAN

Attesting Officer

*Commissioner of Patents and Trademarks*